(12) United States Patent
Kim et al.

(10) Patent No.: US 11,674,001 B2
(45) Date of Patent: Jun. 13, 2023

(54) BACKLIGHT UNIT AND DISPLAY DEVICE

(71) Applicant: LG Display Co., Ltd., Seoul (KR)

(72) Inventors: Jaeyeong Kim, Paju-si (KR); Junha Hwang, Paju-si (KR)

(73) Assignee: LG Display Co., Ltd., Seoul (KR)

(*) Notice: Subject to any disclaimer, the term of this patent is extended or adjusted under 35 U.S.C. 154(b) by 7 days.

(21) Appl. No.: 17/524,040

(22) Filed: Nov. 11, 2021

(65) Prior Publication Data

US 2022/0185966 A1 Jun. 16, 2022

(30) Foreign Application Priority Data

Dec. 14, 2020 (KR) .................. 10-2020-0174884

(51) Int. Cl.
*C08G 77/20* (2006.01)
*G02F 1/13357* (2006.01)

(52) U.S. Cl.
CPC ....... *C08G 77/20* (2013.01); *G02F 1/133605* (2013.01); *G02F 1/133608* (2013.01)

(58) Field of Classification Search
CPC ......... G02F 1/133605; G02F 1/133608; C08G 77/20; C09J 183/04
See application file for complete search history.

(56) References Cited

U.S. PATENT DOCUMENTS

| | | | | |
|---|---|---|---|---|
| 8,084,530 B2* | 12/2011 | Tanikawa | ............... | C08L 83/12 |
| | | | | 525/478 |
| 8,319,242 B2* | 11/2012 | Shiobara | ................ | H01L 33/44 |
| | | | | 257/97 |
| 9,806,236 B2* | 10/2017 | Kitano | ................. | C09K 11/617 |
| 10,290,558 B2* | 5/2019 | Rantala | .................. | H01L 33/56 |
| 11,022,841 B2* | 6/2021 | Ryu | ................. | G02F 1/133605 |
| 11,249,231 B2* | 2/2022 | Zha | ....................... | G02B 5/3041 |
| 11,500,145 B2* | 11/2022 | deWijs | ..................... | G02B 1/18 |
| 2009/0283794 A1* | 11/2009 | Mizuno | ................... | C08L 83/04 |
| | | | | 257/E33.059 |
| 2011/0286222 A1* | 11/2011 | Coleman | ............. | G02B 6/0065 |
| | | | | 156/219 |
| 2016/0264820 A1* | 9/2016 | Kikuchi | ................ | C09D 181/00 |
| 2019/0099613 A1* | 4/2019 | Estes | ..................... | A61N 5/0616 |
| 2020/0217998 A1* | 7/2020 | Jung | ...................... | G02B 5/201 |

* cited by examiner

*Primary Examiner* — Arman B Fallahkhair
(74) *Attorney, Agent, or Firm* — Fenwick & West LLP

(57) ABSTRACT

Embodiments of the present disclosure relate to a backlight unit and a display device, and more particularly, may provide a backlight unit and a display device including the backlight unit having a thin thickness while having excellent optical performance and reliability by including a first protective layer including a first silicone polymer.

24 Claims, 3 Drawing Sheets

BACKLIGHT UNIT AND DISPLAY DEVICE

CROSS REFERENCE TO RELATED APPLICATIONS

This application claims priority from Republic of Korea Patent Application No. 10-2020-0174884, filed on Dec. 14, 2020, which is hereby incorporated by reference for all purposes as if fully set forth herein.

FIELD

The present disclosure relates to a backlight unit and a display device.

BACKGROUND

The growth of the information society leads to increased demand for various types of display devices, and in recent years, various display devices such as a liquid crystal display device and an organic light emitting display device are utilized.

The display device may include a display panel in which a plurality of subpixels is disposed, and various driving circuits for driving elements disposed in the subpixels. In addition, depending on the type of the display device, a backlight unit for supplying light to the display panel may be included.

The backlight unit may include a plurality of light sources and several optical members. In addition, the backlight unit may be disposed on the opposite side of the surface of the display panel on which the image is displayed to supply light to the display panel.

However, there is a problem in that the thickness of the display device is increased due to the backlight unit or the image quality is deteriorated due to the change over time of the backlight unit.

SUMMARY

Embodiments of the present disclosure may provide a backlight unit having a thin thickness and a display device including the same.

In addition, embodiments of the present disclosure may provide a backlight unit having excellent reliability and a display device including the same.

In one aspect, embodiments of the present disclosure may provide a backlight unit including a printed circuit, a light source disposed on the printed circuit, a first protective layer disposed on the light source, and a base film disposed on the first protective layer.

The first protective layer includes a first silicone polymer and a first platinum catalyst.

The backlight unit may further include a solder resist ink layer located on the printed circuit. In this case, the light source may be located on the solder resist ink layer, and the first protective layer may be in direct contact with the solder resist ink layer.

The backlight unit may further include a reflection plate. In this case, the reflection plate may be disposed on the printed circuit, and may include a plurality of holes positioned in an area corresponding to the light source.

The first platinum catalyst may be platinum acetylacetonate.

The first silicone polymer may be a cured product of a first composition. In this case, the first composition may include a first low molecular weight siloxane oligomer, a first high molecular weight siloxane oligomer, and a first cross-linking agent.

The first low molecular weight siloxane oligomer may have a weight average molecular weight (Mw) of 1,000 to 25,000.

The first low molecular weight siloxane oligomer may be vinyl terminated polydimethylsiloxanes.

The first high molecular weight siloxane oligomer may have a weight average molecular weight (Mw) of 30,000 to 100,000.

The first high molecular weight siloxane oligomer may be vinyl terminated polydimethylsiloxanes.

The first cross-linking agent may have three or more cross-linkable functional groups.

The first composition may include 70 wt % to 80 wt % of the first low molecular weight siloxane oligomer, 20 wt % to 30 wt % of the first high molecular weight siloxane oligomer, 2 wt % to 5 wt % of the first cross-linking agent, and 0.1 wt % to 0.3 wt % of the first platinum catalyst.

The first composition may have a viscosity of 7,000 cP to 10,000 cP.

The backlight unit may further include a second protective layer disposed on the first protective layer.

The second protective layer may be an optically clear adhesive layer.

The second protective layer may include a second silicone polymer and a second platinum catalyst.

The second platinum catalyst may be platinum acetylacetonate.

The second silicone polymer may be a cured product of a second composition.

The second composition may include a second low molecular weight siloxane oligomer, a second high molecular weight siloxane oligomer, and a second cross-linking agent.

The second low molecular weight siloxane oligomer may have a weight average molecular weight (Mw) of 1,000 to 25,000.

The second low molecular weight siloxane oligomer may be vinyl terminated polydimethylsiloxanes.

The second high molecular weight siloxane oligomer may have a weight average molecular weight (Mw) of 30,000 to 100,000.

The second high molecular weight siloxane oligomer may be vinyl terminated polydimethylsiloxanes.

The second cross-linking agent may include one cross-linkable functional group.

The second composition may include 20 wt % to 30 wt % of the second low molecular weight siloxane oligomer, 70 wt % to 80 wt % of the second high molecular weight siloxane oligomer, 1 wt % to 5 wt % of the second cross-linking agent, and 0.1 wt % to 0.3 wt % of the second platinum catalyst.

The first composition may have a viscosity of 1,000 cP to 10,000 cP.

The second composition may have a viscosity of 10,000 cP to 100,000 cP.

In another aspect, embodiments of the present disclosure may provide a display device including a backlight unit according to embodiments of the present disclosure, and a display panel positioned on the backlight unit and receiving light from the backlight unit.

According to embodiments of the present disclosure, it is possible to provide a backlight unit and a display device having a thin thickness by including a first protective layer including a first silicone polymer and a first platinum catalyst.

According to embodiments of the present disclosure, it is possible to provide a backlight unit and a display device with excellent reliability by including a first protective layer including a first silicone polymer and a first platinum catalyst.

DETAILED DESCRIPTION

Figure 1:
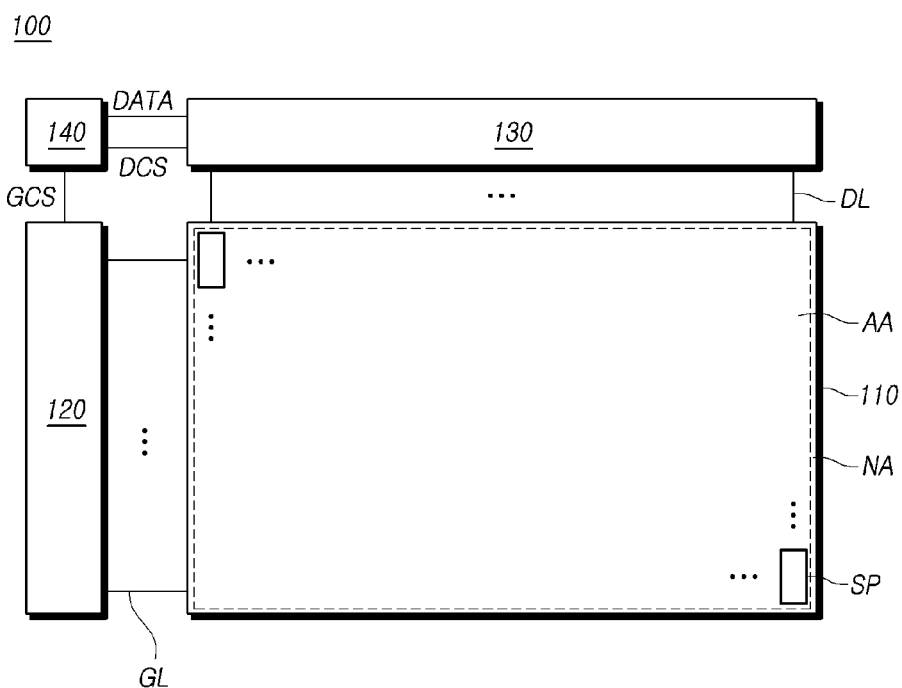
FIG. 1 schematically illustrates a configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 schematically illustrates a configuration of a display device 100 according to embodiments of the present disclosure.

Referring to FIG. 1, the display device 100 may include a display panel 110 including an active area AA and a non-active area NA, a gate driving circuit 120, a data driving circuit 130, a controller 140 for driving the display panel 110, or the like.

A plurality of gate lines GL and a plurality of data lines DL may be disposed on the display panel 110. The subpixel SP may be positioned in a region where the gate line GL and the data line DL intersect.

The gate driving circuit 120 is controlled by the controller 140. The gate driving circuit 120 can sequentially output scan signals to the plurality of gate lines GL arranged on the display panel 110, thereby controlling the driving timing of the plurality of subpixels SP.

The gate driving circuit 120 may include one or more gate driver integrated circuits GDIC. The gate driving circuit 120 may be located only at one side of the display panel 110, or can be located at both sides thereof according to a driving method.

Each gate driver integrated circuit GDIC may be connected to a bonding pad of the display panel 110 by a tape automated bonding (TAB) method or a chip-on-glass (COG) method. Alternatively, each gate driver integrated circuit GDIC may be implemented as a gate-in-panel (GIP) type and disposed directly on the display panel 110. Alternatively, each gate driver integrated circuit GDIC may be integrated and disposed on the display panel 110 in some cases. Alternatively, each gate driver integrated circuit GDIC may be implemented in a chip-on-film (COF) method mounted on a film connected to the display panel 110.

The data driving circuit 130 may receive data signal from the controller 140 and converts the data signal into an analog data voltage Vdata. The data driving circuit 130 outputs the data voltage Vdata to each data line DL according to the timing at which the scan signal is applied through the gate line GL so that each of the plurality of subpixels SP emits light having brightness according to the data signal.

The data driving circuit 130 may include one or more source driver integrated circuits SDIC.

Each source driver integrated circuit SDIC may include a shift register, a latch circuit, a digital-to-analog converter, an output buffer, and the like.

Each source driver integrated circuit SDIC may be connected to a bonding pad of the display panel 110 by a tape automated bonding (TAB) method or a chip-on-glass (COG) method. Alternatively, each source driver integrated circuit SDIC may be disposed directly on the display panel 110. Alternatively, each source driver integrated circuit SDIC may be integrated and disposed on the display panel 110 in some cases. Alternatively, each source driver integrated circuit SDIC may be implemented in a chip-on-film (COF) manner. In this case, each source driver integrated circuit SDIC may be mounted on a film connected to the display panel 110, and may be electrically connected to the display panel 110 through lines on the film.

The controller 140 may supply various control signals to the gate driving circuit 120 and the data driving circuit 130, and control the operation of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through a printed circuit board or a flexible printed circuit.

The controller 140 may control the gate driving circuit 120 to output a scan signal according to timing implemented in each frame. The controller 140 may convert externally received image data to match a signal format used by the data driving circuit 130, and output the converted data signal to the data driving circuit 130.

The controller 140 may receive various timing signals including a vertical synchronization signal VSYNC, a horizontal synchronization signal HSYNC, an input data enable signal DE, a clock signal CLK from the outside (e.g., host system).

The controller 140 may generate various control signals by using various timing signals received from the outside, and may output the control signals to the gate driving circuit 120 and the data driving circuit 130.

For example, in order to control the gate driving circuit 120, the controller 140 may output various gate control signals GCS including a gate start pulse GSP, a gate shift clock GSC, and a gate output enable signal GOE.

Here, the gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 may output various data control signals DCS including a source start pulse SSP, a source sampling clock SSC, a source output enable signal SOE, or the like.

Here, the source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 may further include a power management integrated circuit (not shown) for supplying various voltages or currents to the display panel 110, the gate driving circuit 120, the data driving circuit 130, and the like or controlling various voltages or currents to be supplied thereto.

Each subpixel SP may be a region defined by the intersection of the gate line GL and the data line DL, in which at least one circuit element including a light emitting device may be disposed.

For example, in the case that the display device 100 is a liquid crystal display device, the display device includes a light source device such as a backlight unit for emitting light to the display panel 110, and a liquid crystal is disposed in the subpixel SP of the display panel 110. In addition, by adjusting the arrangement of the liquid crystal by the electric field formed in applying the data voltage to each subpixel SP, the image can be displayed with brightness according to the image data.

Figure 2:
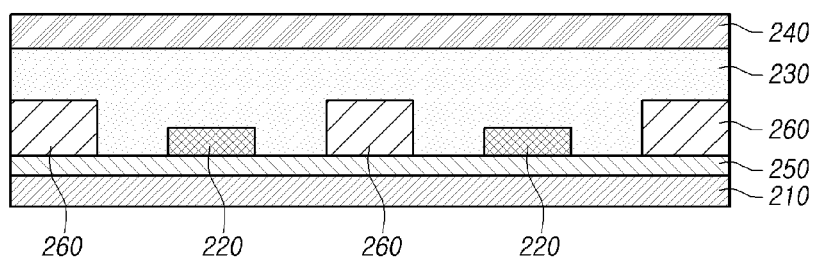
FIGS. 2 and 3 illustrate a backlight unit according to embodiments of the present disclosure.

FIG. 2 illustrates an example of the structure of a backlight unit 200 included in a display device 100 according to embodiments of the present disclosure.

Referring to FIG. 2, the backlight unit 200 includes a printed circuit 210, a light source 220 disposed on the printed circuit 210, a first protective layer 230 disposed on the light source 220, and a base film 240 disposed on the first protective layer 230. The first protective layer 230 includes a first silicone polymer and a first platinum catalyst.

The light source 220 may include a light emitting unit for emitting light and an electrode unit to which a signal for driving the light emitting unit is applied.

The light source 220 may be, for example, a light emitting diode (LED), and may be a small mini light emitting diode (Mini LED) or a micro light emitting diode (μLED). Accordingly, the light source 220 in the form of a chip may be disposed to be mounted on the printed circuit 210, thereby reducing the thickness of the backlight unit.

The light source 220 may emit white light or, in some cases, may emit light of a specific wavelength band. For example, the light source 220 may emit blue light, the blue light may be excited through an optical member disposed on the light source 220, and the white light may be supplied to the display panel 110.

A solder resist ink layer 250 may be positioned on the printed circuit 210. The solder resist ink layer 250 is a layer formed of ink having excellent durability in order to protect the printed circuit 210 and prevent a solder bridge phenomenon between circuits from occurring, and may include an acrylic acid component.

A reflection plate 260 may be disposed on the printed circuit 210. The reflection plate 260 may include a plurality of holes, and the light source 220 may be disposed inside the holes included in the reflection plate 260. That is, the reflection plate 260 providing a reflection function may be disposed on at least a partial area of the area where the light source 220 is not disposed on the printed circuit 210.

Here, in the case that the light source 220 is disposed in the form of a chip, since the size of the light source 220 is small, the height of the reflection plate 260 may be greater than the height of the light source 220. That is, the upper surface of the reflection plate 260 may be positioned higher than the upper end of the light source 220 disposed in the hole. Accordingly, the light emitted in the lateral direction of the light source 220 may be reflected from the side surface of the reflection plate 260 and may be emitted to the front surface of the backlight unit, thereby further enhancing the light efficiency of the backlight unit.

The first protective layer 230 may be disposed on the inside of the hole of the reflection plate 260 and on the reflection plate 260.

The first platinum catalyst is a catalyst containing platinum, and may be, for example, platinum acetylacetonate represented by the following chemical Formula 1 (Platinum (II) acetylacetonate).

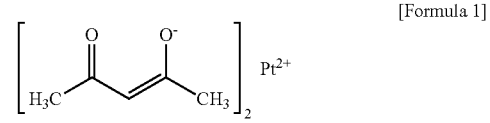

[Formula 1]

The first silicone polymer may be a cured product of a first composition. The first composition may include a first low molecular weight siloxane oligomer, a first high molecular weight siloxane oligomer, and a first cross-linking agent.

The first low molecular weight siloxane oligomer may have a weight average molecular weight (Mw) of 1,000 to 25,000.

In describing the present embodiments, the weight average molecular weight may be a conversion value of standard polystyrene measured by Gel Permeation Chromatograph (GPC).

The lower limit of the weight average molecular weight (Mw) of the first low molecular weight siloxane oligomer may be, for example, 2,000 or more, 30,000 or more, or 5,000 or more. The upper limit of the weight average molecular weight (Mw) of the first low molecular weight siloxane oligomer may be, for example, 20,000 or less, 12,000 or less, or 7,000 or less.

The first low molecular weight siloxane oligomer may be vinyl terminated polydimethylsiloxanes represented by chemical Formula 2 as below.

[Formula 2]

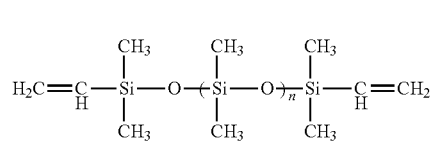

In chemical Formula 2, n is an arbitrary integer for satisfying the weight average molecular weight range of the first low molecular weight siloxane oligomer.

The first high molecular weight siloxane oligomer may have a weight average molecular weight (Mw) of 30,000 to 100,000. The lower limit of the weight average molecular weight (Mw) of the first high molecular weight siloxane oligomer may be, for example, 37,000 or more, 4,4000 or more, or 50,000 or more. The upper limit of the weight average molecular weight (Mw) of the first high molecular weight siloxane oligomer may be, for example, 90,000 or less, 80,000 or less, or 70,000 or less.

The first high molecular weight siloxane oligomer may be vinyl terminated polydimethylsiloxane represented by the following chemical Formula 3.

[Formula 3]

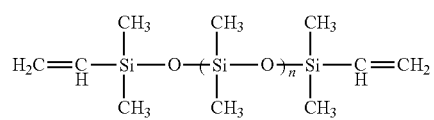

In chemical Formula 3, n is an arbitrary integer for satisfying the weight average molecular weight range of the above-described first high molecular weight siloxane oligomer.

The first low molecular weight siloxane oligomer and the first high molecular weight siloxane oligomer may be siloxane oligomers including the same repeating unit and having different weight average molecular weights. In the case that the first silicone polymer is a cured product of the first composition including siloxane oligomers having the same repeating unit and different weight average molecular weights, the backlight unit may have excellent processability and reliability.

The first cross-linking agent may use a cross-linking agent used in the cross-linking reaction of the silicone polymer, for example, may be a siloxane oligomer having a cross-linkable functional group.

The first cross-linking agent may have three or more cross-linkable functional groups. If the first cross-linking agent has three or more cross-linkable functional groups, it is possible to effectively prevent the first protective layer 230 from being delaminated at the interface in contact with the printed circuit 210. For example, in the case that the first cross-linking agent has three or more cross-linkable functional groups, the solder resist ink layer 250 is positioned on the printed circuit 210, and the first protective layer 230 may be effectively prevented from being delaminated at the interface in contact with the solder resist ink layer 250.

In one example, the first cross-linking agent may be a hydride terminated polyphenyl (dimethyl-hydrosiloxy) siloxane represented by a chemical Formula 4 as below.

[Formula 4]

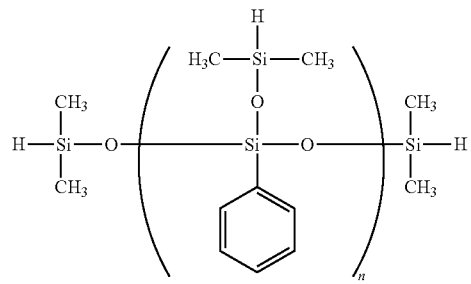

In the Formula 4, n is an arbitrary integer.

The first composition may contain 70 wt % to 80 wt % of the first low molecular weight siloxane oligomer, 20 wt % to 30 wt % of the first high molecular weight siloxane oligomer, 2 wt % to 5 wt % of the first cross-linking agent, and 0.1 wt % to 0.3 wt % of the first platinum catalyst. If the first composition satisfies the above-mentioned ratio, a defoaming process performed after applying the first composition to form the first protective layer 230 may be easily performed. Accordingly, there may be an effect that the backlight unit has excellent reliability.

The first composition may have a viscosity of 7,000 cP to 10,000 cP. The lower limit of the viscosity of the first composition may be, for example, 7,500 cP or 8,000 cP. The upper limit of the viscosity of the first composition may be, for example, 9,500 cP or 9,000 cP. In the case that the viscosity of the first composition satisfies the above-mentioned range, the defoaming process performed after applying the first composition to form the first protective layer may be easily performed, so that the backlight unit can have excellent reliability.

The base film 240 may be, for example, a transparent film such as polycarbonate (PC) or polyethylene terephthalate (PET). One or more optical sheets (not shown) having specific optical properties may be positioned on the base film 240 as needed.

Figure 3:
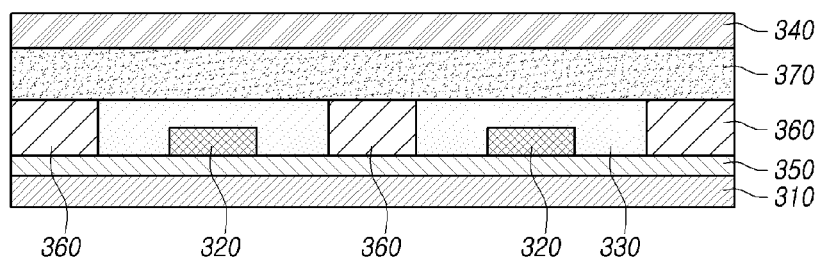

FIG. 3 illustrates an example of the structure of a backlight unit 300 included in a display device 100 according to embodiments of the present disclosure.

Referring to FIG. 3, the backlight unit 300 may include a printed circuit 310, a light source 320 disposed on the printed circuit 310, a first protective layer 330 disposed on the light source 320, and a base film 340 disposed on the first protective layer 330. The first protective layer 330 may include a first silicone polymer and a first platinum catalyst. In addition, the backlight unit 300 may further include a second protective layer 370 disposed on the first protective layer 330.

Since the configuration of the first silicone polymer and the first platinum catalyst included in the first protective layer 330 are the same as that of the first silicone polymer and the first platinum catalyst included in the first protective layer 230 described above with reference to FIG. 2 unless otherwise specified, it will be omitted the duplicate description therefor.

The second protective layer 370 may be positioned on the first protective layer 330.

In some embodiments of the present disclosure, the second protective layer 370 may be an optically clear adhesive layer (OCA). The type of the optically clear adhesive layer is not particularly limited, and may be, for example, an optically clear adhesive layer including an acrylic resin.

In the case that the second protective layer 370 is an optically clear adhesive layer, there is an advantage in that the backlight unit 300 can be easily manufactured by laminating an optically clear adhesive film. In addition, since the optically clear adhesive layer can achieve excellent optical performance even when it has a thin thickness, it is possible to provide a backlight unit having a thin thickness.

In an embodiment of the present disclosure, the second protective layer 370 may include a second silicone polymer and a second platinum catalyst.

The second platinum catalyst may be a catalyst containing platinum, and may be, for example, platinum acetylacetonate (Platinum(II) acetylacetonate) represented by the following chemical Formula 1.

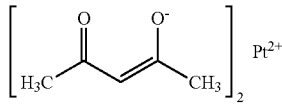
[Formula 1]

The second silicone polymer may be a cured product of a second composition. The second composition may include a second low molecular weight siloxane oligomer, a second high molecular weight siloxane oligomer, and a second cross-linking agent.

The second low molecular weight siloxane oligomer may have a weight average molecular weight (Mw) of 1,000 to 25,000. The lower limit of the weight average molecular weight (Mw) of the second low molecular weight siloxane oligomer may be, for example, 2,000 or more, 30,000 or more, or 5,000 or more. The upper limit of the weight average molecular weight (Mw) of the second low molecular weight siloxane oligomer may be, for example, 20,000 or less, 12,000 or less, or 7,000 or less.

The second low molecular weight siloxane oligomer may be vinyl terminated polydimethylsiloxanes represented by the following chemical Formula 5.

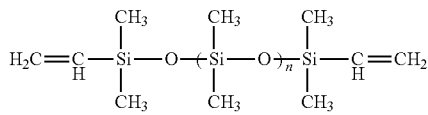
[Formula 5]

In the chemical formula 5, n is an arbitrary integer for satisfying the weight average molecular weight range of the second low molecular weight siloxane oligomer.

The second high molecular weight siloxane oligomer may have a weight average molecular weight (Mw) of 30,000 to 100,000. The lower limit of the weight average molecular weight (Mw) of the second high molecular weight siloxane oligomer may be, for example, 37,000 or more, 4,4000 or more, or 50,000 or more. The upper limit of the weight average molecular weight (Mw) of the second high molecular weight siloxane oligomer may be, for example, 90,000 or less, 80,000 or less, or 70,000 or less.

The second high molecular weight siloxane oligomer may be vinyl terminated polydimethylsiloxanes represented by the following chemical Formula 6.

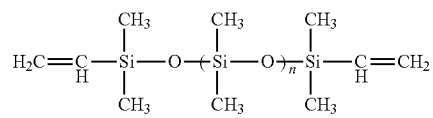
[Formula 6]

In the formula 6, n is an arbitrary integer for satisfying the weight average molecular weight range of the second high molecular weight siloxane oligomer.

In The second low molecular weight siloxane oligomer and the second high molecular weight siloxane oligomer may be siloxane oligomers including the same repeating unit and having different weight average molecular weights. In the case that the second silicone polymer is a cured product of the second composition including siloxane oligomers having the same repeating unit and different weight average molecular weights, the backlight unit may have excellent processability and reliability.

As the second cross-linking agent, there may be used a cross-linking agent used in the cross-linking reaction of the silicone polymer, for example, a siloxane oligomer having a cross-linking functional group may be used.

The second cross-linking agent may have one cross-linkable functional group. Since the second protective layer 370 is not in direct contact with the printed circuit 310, the second protective layer 370 may have one cross-linkable functional group. For example, since the solder resist ink layer 350 positioned on the printed circuit 310 and the second protective layer 370 are not in direct contact with each other, there may be an effect of smoothly proceeding curing by including one cross-linkable functional group.

In one example, the second cross-linking agent may be trimethylsiloxy terminated polymethyl-hydrosiloxanes represented by a chemical Formula 7 as below.

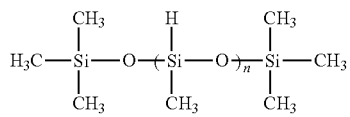
[Formula 7]

In the Formula 7, n is an arbitrary integer.

The second composition may contain 20 wt % to 30 wt % of the second low molecular weight siloxane oligomer, 70 wt % to 80 wt % of the second high molecular weight siloxane oligomer, 1 wt % to 5 wt % of the second cross-linking agent, and 0.1 wt % to 0.3 wt % of the second platinum catalyst. In the case that the second composition satisfies the above-mentioned ratio, the second composition has excellent coating formability and can be cured quickly, so that the backlight unit can have excellent processability and excellent reliability.

In embodiments in which the second protective layer 370 includes the second silicone polymer and the second platinum catalyst, the first composition may have a viscosity of 1,000 cP to 10,000 cP. The lower limit of the viscosity of the first composition may be, for example, 2,000 cP or 3,000 cP. The upper limit of the viscosity of the first composition may be, for example, 9,000 cP or 8,000 cP. If the viscosity of the first composition satisfies the above-mentioned range, there may be more easily performed the process of applying and curing the first protective layer 330 before forming the second protective layer 370 by the second composition, so that there is an effect that the backlight unit 300 can have excellent reliability.

The second composition may have a viscosity of 10,000 cP to 100,000 cP. The lower limit of the viscosity of the second composition may be, for example, 20,000 cP or 30,000 cP. The upper limit of the viscosity of the second composition may be, for example, 80,000 cP or 60,000 cP. In the case that the viscosity of the second composition satisfies the above-mentioned range, the second composition has excellent coating formability so that the backlight unit 300 may have excellent processability and excellent reliability.

A display device according to embodiments of the present disclosure may include a backlight unit, and a display panel positioned on the backlight unit and receiving light from the backlight unit.

In the display device according to the embodiments of the present disclosure, since the details regarding the backlight unit are the same as those described for the backlight unit according to the embodiments of the present disclosure, it will be omitted the duplicate description thereof.

Hereinafter, examples of manufacturing a backlight unit and a display device according to embodiments of the present disclosure in detail will be described, but embodiments of the present disclosure are not limited thereto.

[Evaluation of Changes Over Time in Optical Performance of the Protective Layer Under Constant Temperature and Humidity Conditions]

[Sample Preparation for Reliability Evaluation]

A reflection plate having a plurality of holes and having a thickness of 0.25 mm was attached to a glass substrate by a lamination process, and a protective layer was formed on the reflection plate according to the following preparation examples and comparative preparation examples.

Preparation Example 1. Preparation of a Protective Layer Composed of Silicone Resin A There has been applied a composition A containing 1) 75 wt % of vinyl terminated polydimethylsiloxanes which have a weight average molecular weight of 6,000 and is represented by the following formula (A), 2) 22.9 wt % of vinyl terminated polydimethylsiloxanes which are represented by the following formula (A) and have a weight average molecular weight of 60,000, 3) 2 wt % of a hydride terminated polyphenyl (dimethyl-hydrosiloxy) siloxane represented by the following formula (B), and 4) 0.1 wt % of a platinum (II) acetylacetonate catalyst on a reflection plate. And then, a heat curing (30 minutes at 60° C.) after UV curing (5 J/cm2) was performed to form a protective layer having a thickness of 0.5 mm from the reflection plate.

[Formula (A)]

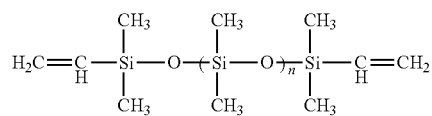

[Formula (B)]

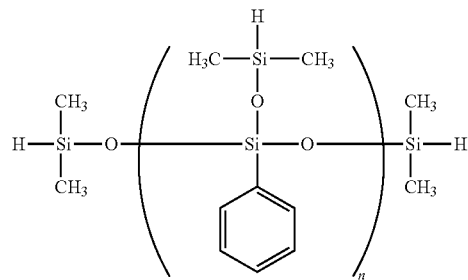

Preparation Example 2. Preparation of a Protective Layer Composed of Silicone Resin B There has been applied a composition B containing 1) 25 wt % of vinyl terminated polydimethylsiloxanes which have a weight average molecular weight of 6,000 and is represented by the above formula (A), 2) 71.7 wt % of vinyl terminated polydimethylsiloxanes which are represented by the above formula (A) and have a weight average molecular weight of 60,000, 3) 3 wt % of a hydride terminated polyphenyl (dimethyl-hydrosiloxy) siloxane represented by the following formula (C), and 4) 0.3 wt % of a platinum (II) acetylacetonate catalyst on a reflection plate. And then, a heat curing after UV curing was performed to form a protective layer having a thickness of 0.5 mm from the reflection plate.

[Formula (C)]

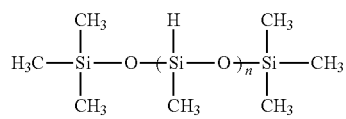

Comparative Preparation Example 1. Preparation of a Protective Layer Composed of a Comparative Resin After coating a composition C comprising 25 wt % of a thiol siloxane monomer, 70 wt % of a vinyl siloxane oligomer, 4 wt % of an adhesion enhancer, and 1 wt % of a photo-initiator on a reflection plate, UV curing was performed to form a protective layer having a thickness of 0.5 mm from the reflection plate.

[Temperature and Humidity Test 1: 85° C., 85RH, 1000 Hr]

The transmittance, yellowness and haze of the samples prepared according to preparation examples and comparative preparation examples have been measured. Then, the transmittance, yellowness and haze were measured after standing for 1000 hours at 85° C. and 85% relative humidity. The measurement of the transmittance, yellowness, and haze were performed for the holes of the reflection plate of the sample, and the measurement results are shown in Table 1 below. In Table 1, a portion adjacent to the reflection plate is a point within 1 cm of the distance from the reflection plate in the reflection plate hole, and a portion of the reflection plate hole is a point at a distance of 1 cm or more from the reflection plate.

[Measurement of Transmittance]

The transmittance of the sample was measured using the COH400 of NIPPON DENSHOKU CORPORATION.

[Measurement of Yellowness]

The yellowness of the sample was measured using the COH400 of NIPPON DENSHOKU CORPORATION.

[Measurement of Haze]

The haze of the sample was measured using the COH400 of NIPPON DENSHOKU CORPORATION.

TABLE 1

| time | | 0 h | 1000 h |
|---|---|---|---|
| Preparation Example 1. Protective layer composed of silicone resin A | | | |
| A portion adjacent to reflection plate | transmittance | 99.24 | 99.59 |
| | yellowness | 0.36 | 0.86 |
| | haze | 0.03 | 0.20 |
| A portion of reflection plate hole | transmittance | 99.69 | 99.06 |
| | yellowness | 0.40 | 0.68 |
| | haze | 0.22 | 0.29 |
| Preparation Example 2. Protective layer composed of silicone resin B | | | |
| A portion adjacent to reflection plate | transmittance | 99.69 | 99.39 |
| | yellowness | 0.50 | 0.78 |
| | haze | 0.31 | 0.08 |
| A portion of reflection plate hole | transmittance | 99.16 | 99.12 |
| | yellowness | 0.62 | 0.73 |
| | haze | 0.80 | 0.04 |
| Comparative Preparation Example 1. Protective layer composed of comparative resin | | | |
| A portion adjacent to reflection plate | transmittance | 99.95 | 99.89 |
| | yellowness | 0.51 | 2.67 |
| | haze | 0.43 | 0.32 |
| A portion of reflection plate hole | transmittance | 99.89 | 99.93 |
| | yellowness | 0.52 | 1.05 (E 2.20) |
| | haze | 0.39 | 0.06 |

Referring to Table 1, there can be seen that the protective layers prepared according to the preparation examples 1 and 2 according to embodiments of the present disclosure have excellent transmittance, yellowness and haze even after being leaved for 1000 hours at 85° C. and 85% relative humidity. On the other hand, in the case of the protective layer according to the comparative preparation example, it can be seen that after 1000 hours at 85° C. and 85% relative humidity, the yellowness increased too much and yellowing occurred.

[Temperature and Humidity Test 2: 120° C., 1000 Hr]

After measuring the transmittance, yellowness and haze of the samples prepared according to preparation examples and comparative preparation examples, the occurrence of yellowing was visually observed after leaving at 120° C. for 1000 hours.

O: No yellowing after leaving for 1000 hours at 120° C. and 85% relative humidity X: Yellowing occurs after leaving for 1000 hours at 120° C. and 85% relative humidity

TABLE 2

| | Preparation Example 1 | Preparation Example 2 | Comparative Preparation Example 1 |
|---|---|---|---|
| Whether yellowing occurs | O (No yellowing) | O (No yellowing) | X (yellowing occurs) |

Referring to Table 2, there can be seen that, for the protective layers prepared according to the preparation examples 1 and 2 according to embodiments of the present disclosure, no yellowing occurs even after 1000 hours at 120° C. and 85% relative humidity. On the other hand, in the case of the protective layer according to the comparative preparation example, it can be seen that yellowing occurred after 1000 hours at 120° C. and 85% relative humidity.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present invention for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A backlight unit comprising:
   a printed circuit;
   a light source disposed on the printed circuit;
   a first protective layer disposed on the light source; and
   a base film disposed on the first protective layer,
   wherein the first protective layer comprises a first silicone polymer and a first platinum catalyst,
   wherein the first platinum catalyst is platinum acetylacetonate, and
   wherein the first silicone polymer is a cured product of a first composition comprising a first low molecular weight siloxane oligomer, a first high molecular weight siloxane oligomer, and a first cross-linking agent.

2. The backlight unit of claim 1, further comprising a second protective layer disposed on the first protective layer.

3. The backlight unit of claim 2, wherein the second protective layer comprises a second silicone polymer and a second platinum catalyst.

4. The backlight unit of claim 3, wherein the second silicone polymer is a cured product of a second composition comprising a second low molecular weight siloxane oligomer, a second high molecular weight siloxane oligomer, and a second cross-linking agent.

5. The backlight unit of claim 4, wherein the second low molecular weight siloxane oligomer has a weight average molecular weight (Mw) of 1,000 to 25,000.

6. The backlight unit of claim 4, wherein the second low molecular weight siloxane oligomer is vinyl terminated polydimethylsiloxanes.

7. The backlight unit of claim 4, wherein the second high molecular weight siloxane oligomer has a weight average molecular weight (Mw) of 30,000 to 100,000.

8. The backlight unit of claim 4, wherein the second high molecular weight siloxane oligomer is vinyl terminated polydimethylsiloxanes.

9. The backlight unit of claim 4, wherein the second cross-linking agent comprises one cross-linkable functional group.

10. The backlight unit of claim 4, wherein the second composition comprises 20 wt % to 30 wt % of the second low molecular weight siloxane oligomer, 70 wt % to 80 wt % of the second high molecular weight siloxane oligomer, 1 wt % to 5 wt % of the second cross-linking agent, and 0.1 wt % to 0.3 wt % of the second platinum catalyst.

11. The backlight unit of claim 4, wherein the second composition has a viscosity of 10,000 cP to 100,000 cP.

12. The backlight unit of claim 3, wherein the second platinum catalyst is platinum acetylacetonate.

13. The backlight unit of claim 3, wherein the first composition has a viscosity of 1,000 cP to 10,000 cP.

14. The backlight unit of claim 2, wherein the second protective layer is an optically clear adhesive layer.

15. The backlight unit of claim 1, further comprising a solder resist ink layer located on the printed circuit,
wherein the light source is located on the solder resist ink layer, and the first protective layer is in direct contact with the solder resist ink layer.

16. The backlight unit of claim 1, further comprising a reflection plate disposed on the printed circuit and including a plurality of holes positioned in an area corresponding to the light source.

17. The backlight unit of claim 1, wherein the first low molecular weight siloxane oligomer has a weight average molecular weight (Mw) of 1,000 to 25,000.

18. The backlight unit of claim 1, wherein the first low molecular weight siloxane oligomer is vinyl terminated polydimethylsiloxanes.

19. The backlight unit of claim 1, wherein the first high molecular weight siloxane oligomer has a weight average molecular weight (Mw) of 30,000 to 100,000.

20. The backlight unit of claim 1, wherein the first high molecular weight siloxane oligomer is vinyl terminated polydimethylsiloxanes.

21. The backlight unit of claim 1, wherein the first cross-linking agent comprises three or more cross-linkable functional groups.

22. The backlight unit of claim 1, wherein the first composition comprises 70 wt % to 80 wt % of the first low molecular weight siloxane oligomer, 20 wt % to 30 wt % of the first high molecular weight siloxane oligomer, 2 wt % to 5 wt % of the first cross-linking agent, and 0.1 wt % to 0.3 wt % of the first platinum catalyst.

23. The backlight unit of claim 1, wherein the first composition has a viscosity of 7,000 cP to 10,000 cP.

24. A display device comprising:
a backlight unit of claim 1; and
a display panel positioned on the backlight unit and receiving light from the backlight unit.

* * * * *